Dec. 18, 1923. 1,477,902
W. G. ROBINSON
WIRE FENCE STRETCHER
Filed Jan. 31, 1923 2 Sheets-Sheet 2
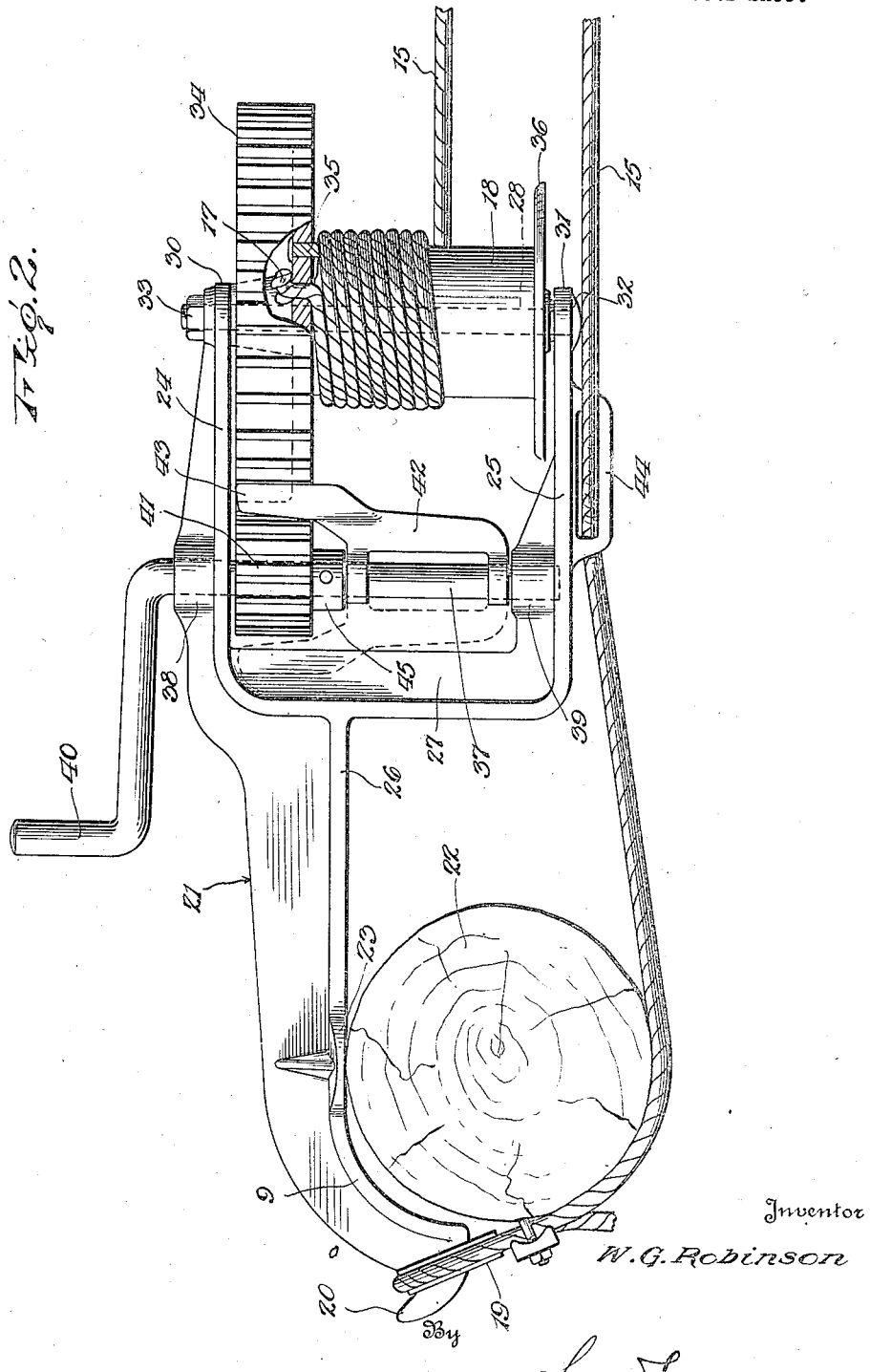
Inventor
W. G. Robinson
By
Lacey & Lacey, Attorneys Patented Dec. 18, 1923.

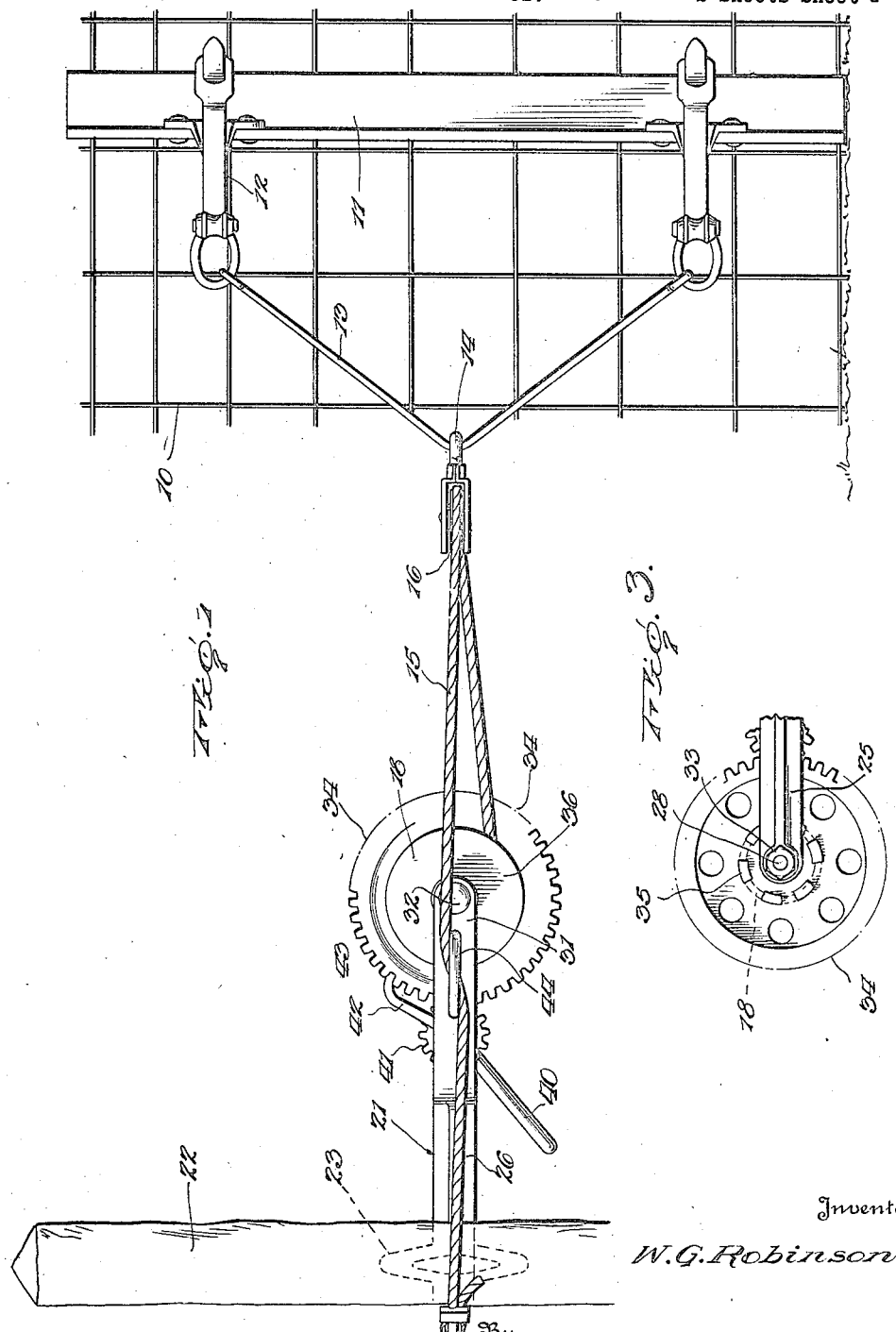

1,477,902

UNITED STATES PATENT OFFICE.

WILLIAM G. ROBINSON, OF BATAVIA, IOWA.

WIRE-FENCE STRETCHER.

Application filed January 31, 1923. Serial No. 616,117.

*To all whom it may concern:*

Be it known that I, WILLIAM G. ROBINSON, a citizen of the United States, residing at Batavia, in the county of Jefferson and State of Iowa, have invented certain new and useful Improvements in Wire-Fence Stretchers, of which the following is a specification.

My invention relates to wire fence stretchers and has for its main object to provide a strong and powerful device of this kind for use in stretching wire netting used for fences. Another object is to provide a stretcher, by means of which an even pull is exerted on the entire width of the net, and to hold the latter in its stretched condition while it is nailed to a fence post.

Still another object of the invention is to furnish a device of this character that is easily attached or detached, and which is accordingly economical and time saving.

In the accompanying drawings one embodiment of the invention is illustrated, and Figure 1 is a side elevation of a portion of a wire fence with the stretcher attached ready for operation;

Figure 2 is a top plan view of the stretcher on a larger scale; and

Figure 3 is a fragmentary elevation of some of the details.

In the drawings reference numeral 10 represents a portion of a wire fence and 11 represents a clamp which grips the fence wire along its entire width, or from top to bottom of the fence. This clamp may be of the general character described and illustrated in my Patent, No. 1,155,276, or in my pending application, Serial No. 608,296, filed December 21, 1922. No further description of the clamp is therefore needed, but it might, however, be mentioned that the jaws 12 are connected by means of a double hook or connecting member 13 engaging both top and bottom jaws.

The hook 14 of the block and tackle arrangement is attached to the connecting member 13 and the rope 15 of the tackle runs around the block pulley 16 in the usual manner. One end of the rope 15 is securely attached, as at 17, on a drum 18 upon which the rope is intended to be coiled up during the operation of the stretcher. The other end of the rope has an eye 19 intended to engage with a hook or nose 20 at one end of the frame 21. This end of the frame is, accordingly, bent as indicated at 9 in Figure 2 to reach partly around the fence post 22 and is provided with a reinforced T-piece 23 reaching up and down along the post 22, in order to steady the frame when engaged with the post.

The other end of the frame 21 is bifurcated, as best seen in Figure 2, that is to say, it has two arms 24 and 25 spaced sufficiently apart to permit the drum 18 to revolve between them. The arms 24 and 25 as well as the main shank 26 of the frame are preferably of T-shaped cross section, and a reinforcing flange 27 is adapted to still further strengthen the construction.

The drum 18 is mounted to freely revolve upon a spindle 28 carried at the free ends of the arms 24 and 25, while bearings 30 and 31 are furnished for this purpose and this spindle has a thin head 32 at one end, and is secured by means of a nut 33 threaded at the opposite end of the spindle. To the drum 18 is rigidly attached a spur gear 34, which is preferably made as a separate casting or forging in order to facilitate manufacture, and secured to the drum by means of a plurality of short fingers or studs 35 engaging in corresponding apertures in the spur gear 34 and riveted over on the opposite side thereof, as best seen in Figure 3. The inner side of the spur gear 34 is smooth and forms a guard for the rope while coiling up on the drum 18, the latter being provided at its opposite end with a wide flange or disk for the same purpose.

Reference numeral 37 represents a crank shaft revolubly mounted in bearings 38 and 39 provided in the frame 21 and having its axis parallel to the axis of the spindle 28. One end of the crank shaft 37 is formed as a crank handle 40 for turning the shaft 37, and rigidly mounted on this shaft is a small pinion 41 meshing with the spur gear 34, and held in position by a retaining washer 45.

Reference numeral 42 is a dog or pawl loosely mounted on the crank shaft 37 and provided with a toe 43 extending across the spur gear 34. Ordinarily during operation, the dog 42 is thrown back into the dotted position, as seen in Figure 2, in order not to interfere with the turning of the spur gear, but when the fence wire has been stretched sufficiently, the dog 42 is thrown into the full line position seen in this figure, with the toe 43 placed in between two of the gear teeth, in this manner locking the spur gear from turning and holding the rope 15 and the fence wire stretched while the latter is being nailed to a fence post.

On the outer side of the arm 25 of the frame is provided an elongated ear 44, through which the rope 15 is made to pass before engaging with the nose 20 of the frame. This is for the purpose of supporting this arm 25 during operation.

The device is used in the following manner: The frame 21 is first held at the proper height from the ground against a fence post 22, so that its curved end, carrying the nose 20, reaches partly around to the opposite side of the fence post, counted from the position of the fence wire. The rope 15 is now attached with its eye 19 over the nose 20, while a portion of the rope passes through the ear 44 in the frame. With the dog 42 thrown back into disengaged position, as indicated by dotted lines in Figure 2, the rope is permitted to run off the drum 18 sufficiently to attach hook 14 of the pulley block to the connecting member 13, while the clamps 11 are held against the fence wire. Directly the crank handle 40 is turned the rope 15 will be tensioned and pull on the connecting member 13, thereby causing the clamps 11 to take a firm hold upon the fence wire. By continued turning of the crank handle 40, the pinion 41 and the spur gear 34 are now revolved actuating the drum 18, so that the rope 15 is coiled up thereon, and by this means stretching the wire 10. As soon as the latter has been sufficiently stretched, the dog 42 is thrown into engagement with the teeth of the spur gear 34 to hold the same firmly until the fence wire has been secured by staples against the fence post. After this securing has been completed, the dog 42 is thrown back into its dotted position thereby releasing the spur gear 34, permitting the drum to uncoil the rope 15 to loosen the stretcher which is now attached to the next fence post and the operation repeated.

Having thus described the invention what is claimed as new is:

1. A fence wire stretcher comprising a frame, a drum revolubly mounted therein, a rope associated with said drum and adapted to be attached to the fence wire, a gear wheel rigidly connected to the drum, a crank shaft mounted in the frame with its axis parallel to that of the drum, a pinion secured on said crank shaft and meshing with said gear wheel, and a dog freely mounted on said crank shaft and adapted to be thrown in and out for engaging with said gear wheel.

2. A fence wire stretcher comprising a frame, a drum revolubly mounted therein, a rope associated with said drum and adapted to be attached to the fence wire, a gear wheel rigidly connected to the drum, a crank shaft mounted in the frame with its axis parallel to that of the drum, a pinion secured on said crank shaft and meshing with said gear wheel, and a dog freely mounted on said crank shaft and adapted to be thrown in and out for engaging with said gear wheel, said frame having an arcuate arm terminating with a nose adapted to engage the free end of said rope, a pulley block being inserted between said free end of the rope and the drum.

3. A fence wire stretcher comprising a frame, a drum revolubly mounted therein, a flexible tension member associated with said drum and adapted to be attached to the fence wire, means on said frame for revolving said drum, and a locking element for said means, said frame having an arcuate arm terminating with a nose adapted to engage the free end of said tension member; said means including a gear wheel rigidly connected to the drum, a crank shaft mounted in the frame with its axis parallel to the axis of the drum, and a pinion secured on said crank shaft and meshing with said gear wheel, said gear wheel adapted to engage with said locking element and said locking element being mounted coaxially with said pinion.

In testimony whereof I affix my signature.

WILLIAM G. ROBINSON. [L. S.]